(12) United States Patent
Kamo

(10) Patent No.: US 11,828,999 B2
(45) Date of Patent: Nov. 28, 2023

(54) LENS BARREL, OPTICAL APPARATUS, AND IMAGE PICKUP APPARATUS

(71) Applicant: CANON KABUSHIKI KAISHA, Tokyo (JP)

(72) Inventor: Daichi Kamo, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 500 days.

(21) Appl. No.: 17/218,729

(22) Filed: Mar. 31, 2021

(65) Prior Publication Data
US 2021/0318511 A1    Oct. 14, 2021

(30) Foreign Application Priority Data
Apr. 9, 2020    (JP) .................... 2020-070661

(51) Int. Cl.
*G02B 7/02*    (2021.01)
(52) U.S. Cl.
CPC .............. *G02B 7/025* (2013.01); *G02B 7/026* (2013.01)
(58) Field of Classification Search
CPC ................................. G02B 7/025; G02B 7/026
See application file for complete search history.

(56) References Cited

U.S. PATENT DOCUMENTS 5,781,351 A * 7/1998 Murakami ............ G02B 7/025
396/529

FOREIGN PATENT DOCUMENTS

JP          H01238612 A     9/1989

* cited by examiner

*Primary Examiner* — James C. Jones
(74) *Attorney, Agent, or Firm* — ROSSI, KIMMS & McDOWELL LLP

(57) ABSTRACT

A lens barrel includes an optical element, a holding member configured to hold the optical element on an inner surface of the holding member, and an adhesive with which a side surface of the optical element and the inner surface of the holding member are adhered to each other. A hole is formed in the holding member from an outer surface toward the inner surface of the holding member. The adhesive is injected in the hole. A groove is formed in the inner surface of the holding member. The groove communicates with the hole. A fitting portion on the inner surface of the holding member disposed on an outer side of the groove is fitted to the side surface of the optical element.

13 Claims, 4 Drawing Sheets

LENS BARREL, OPTICAL APPARATUS, AND IMAGE PICKUP APPARATUS

BACKGROUND OF THE DISCLOSURE

Field of the Disclosure

The disclosure relates to a lens barrel, an optical apparatus, and an image pickup apparatus.

Description of the Related Art

There has been known a lens barrel in which an optical element is bonded to a holding member with an adhesive. In Japanese Patent Application Laid-Open No. H01-238612, the following lens barrel is disclosed. Specifically, a holding member has an injection port for an adhesive on an outer peripheral portion thereof and an adhesive groove in an inner peripheral portion thereof. An adhesive is poured into the adhesive groove from the injection port, thereby bonding an optical element to the holding member.

In the configuration disclosed in Japanese Patent Application Laid-Open No. H01-238612, when the adhesive is injected from the injection port of the holding member, the adhesive may leak from a gap between the optical element and the holding member.

SUMMARY OF THE DISCLOSURE

An aspect of embodiments provides, for example, a lens barrel beneficial in an optical element being adhered thereto with an adhesive.

An aspect of embodiments provides a lens barrel including: an optical element; a holding member configured to hold the optical element on an inner surface of the holding member; and an adhesive with which a side surface of the optical element and the inner surface of the holding member are adhered to each other, wherein a hole is formed in the holding member from an outer surface toward the inner surface of the holding member, the adhesive being injected in the hole; a groove is formed in the inner surface of the holding member, the groove communicating with the hole; and a fitting portion on the inner surface of the holding member disposed on an outer side of the groove is fitted to the side surface of the optical element.

According to the present disclosure, it is possible to provide a lens barrel which is advantageous in bonding an optical element with an adhesive, for example.

Further features of the present invention will become apparent from the following description of exemplary embodiments with reference to the attached drawings.

DESCRIPTION OF THE EMBODIMENTS

First Embodiment

Preferred embodiments of the present invention will now be described in detail in accordance with the accompanying drawings.

Figure 1:
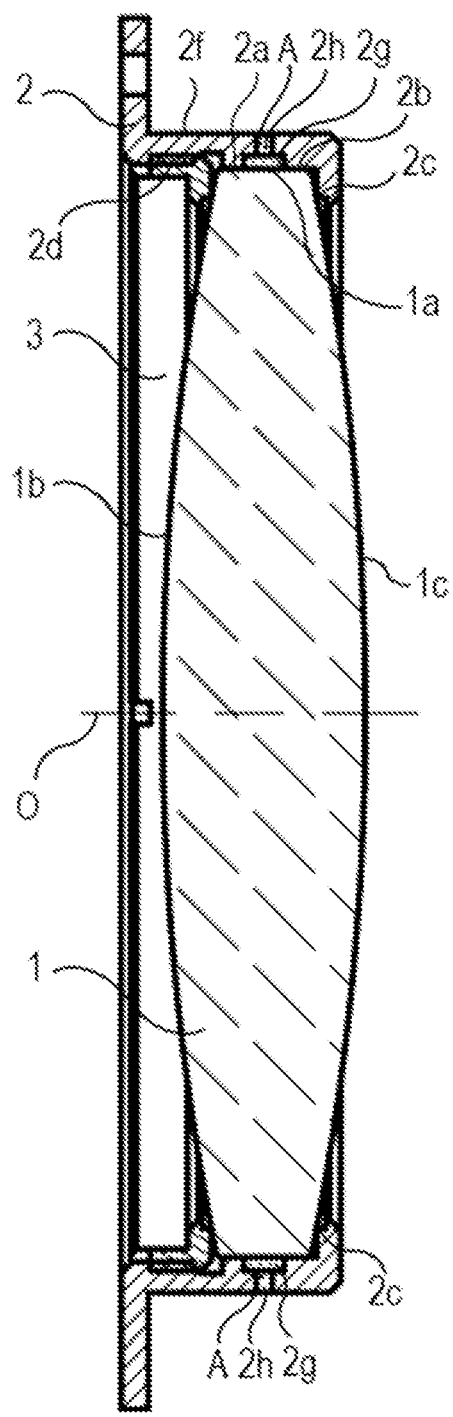
FIG. 1 is a sectional view of a holding lens barrel (2) of a first embodiment.
Figure 2:
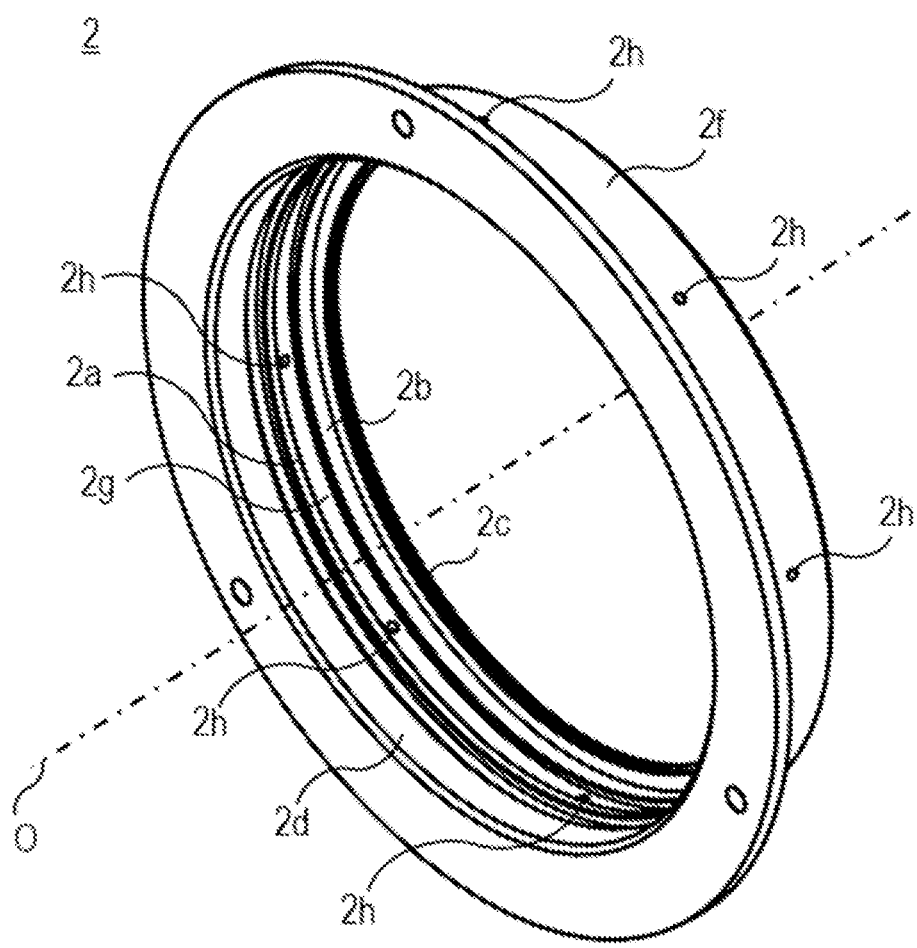
FIG. 2 is a perspective view of the holding lens barrel (2) of the first embodiment.

Now, a first embodiment of the present disclosure is described. FIG. 1 is a sectional view of a state in which a holding lens barrel 2 (holding member) according to the first embodiment holds an optical system 1 (optical element) on an inner surface thereof. FIG. 2 is a perspective view of the holding lens barrel 2 having a cylindrical shape. Further, in the drawings, a front-and-rear direction is defined along an optical axis O, a left side corresponds to a front side, and a right side corresponds to a rear side.

The holding lens barrel 2 includes two fitting portions 2a and 2b, an adhering groove 2g (groove), and a screwing portion 2d on an inner surface thereof. The two fitting portions 2a and 2b are fitted to an outer peripheral surface 1a (side surface) extending along a circumference of the optical system 1. An adhesive A is injected into the adhering groove 2g. A pressing ring 3 (pressing member) configured to fix the optical system 1 is threadedly engaged with the screwing portion 2d. The fitting portions 2a and 2b extend along a circumference of the holding lens barrel 2, and may extend annularly over the entire circumference. Further, the holding lens barrel 2 includes an abutment portion 2c against which one surface 1c of the optical system 1 is to be brought into abutment when the optical system 1 is fitted into the holding lens barrel 2.

The adhering groove 2g is formed between the two fitting portions 2a and 2b in a direction of the optical axis O. The adhering groove 2g extends along the circumference of the holding lens barrel 2, and may extend over the entire circumference of the holding lens barrel 2. That is, the two fitting portions 2a and 2b are formed on the inner surface on the outer side of the adhering groove 2g. Further, a plurality of holes 2h configured to allow injection of the adhesive A into the adhering groove 2g are formed from an outer surface 2f to the inner surface of the holding lens barrel 2, and those holes 2h allow communication between the outer surface 2f and the adhering groove 2g of the holding lens barrel 2. The plurality of holes 2h are arranged, thereby being capable of freely selecting a hole 2h to inject the adhesive A at the time of assembly operation.

Next, assembly and bonding and fixing of the optical system 1 to the holding lens barrel 2 are described. The optical system 1 is fitted into the holding lens barrel 2 along the direction of the optical axis O until the one surface 1c of the optical system 1 is brought into abutment against the abutment portion 2c of the holding lens barrel 2. When the optical system 1 is fitted, the outer peripheral surface 1a of the optical system 1 is fitted to the two fitting portions 2a and 2b of the holding lens barrel 2. Then, the pressing ring 3 is fitted into the screwing portion 2d of the holding lens barrel 2 along the direction of the optical axis O. When the pressing ring 3 is brought into abutment against another surface 1b of the optical system 1, the optical system 1 is positioned in the direction of the optical axis O.

With such threaded engagement of the pressing ring 3, the optical system 1 is sandwiched by the holding lens barrel 2 and the pressing ring 3. A lens barrel includes one or a plurality of holding lens barrels 2 each holding the optical system 1 as described above. After the pressing ring 3 is threadedly engaged, the adhesive A is filled in the adhering groove 2g formed in the inner surface of the holding lens barrel 2 from the holes 2h formed in the outer surface 2f of the holding lens barrel 2. The adhesive A is received in the holes 2h and the adhering groove 2g, thereby bonding and fixing the optical system 1 to the holding lens barrel 2. With the configuration using the pressing ring 3, the optical system 1 is sandwiched by the holding lens barrel 2, but may be sandwiched by, for example, caulking as long as the position of the optical system 1 with respect to the holding lens barrel 2 in the direction of the optical axis O can be substantially fixed. In the case of caulking, the adhesive A is filled in the adhering groove 2g from the holes 2h after the caulking is performed, thereby obtaining the same effect.

With the above-mentioned configuration, the adhesive A is filled in the adhering groove 2g extending over the entire circumference of the holding lens barrel 2. Thus, the bonding area is increased to improve the adhesive strength, thereby obtaining an effect of suppressing positional displacement of the optical system 1 with respect to the holding lens barrel 2 when an impact is applied.

Further, the adhesive A is filled in a space defined by the outer peripheral surface 1a of the optical system 1 and the adhering groove 2g. The adhering groove 2g is formed between the two fitting portions 2a and 2b apart from each other in the front-and-rear direction of the optical axis O. Thus, the fitting portions 2a and 2b have an effect of preventing outflow of the adhesive A. Moreover, the fitting portions 2a and 2b are annularly formed, and each have a protrusion shape protruding in a radial direction which is a direction orthogonal to the direction of the optical axis O, thereby being capable of further reducing the outflow of the adhesive A. As a result, an influence on optical performance due to the outflow of the adhesive A or a wiping process for the adhesive A is reduced, thereby being capable of improving assembly operability. The two fitting portions 2a and 2b are formed along the direction of the optical axis O, but the outflow of the adhesive A can be prevented even with at least one fitting portion.

In the first embodiment, the holes 2h configured to allow injection of the adhesive A are round through holes, but the shape is not limited thereto. As long as the holes 2h pass through the adhering groove 2g and the outer surface 2f of the holding lens barrel 2, the adhesive A can be injected. Thus, for example, the holes 2h may be elongated through holes each having a width in the circumferential direction, thereby being capable of improving operability for filling the adhesive A.

Further, in the first embodiment, the adhering groove 2g is a groove extending over the entire circumference. However, it is only required that the fitting portions 2a and 2b be formed at the front and back in the direction of the optical axis O, and the shape of the groove is not limited thereto. For example, with a groove having a length that can secure the bonding area required to hold the optical system 1, processing time for the holding lens barrel 2 is shortened, thereby being capable of reducing component cost. Similarly, in the first embodiment, the plurality of holes 2h configured to allow injection of the adhesive A are formed. However, with at least one hole 2h, the adhesive A can be injected into the adhering groove 2g. For example, the number of the holes 2h into which the adhesive A is injected is reduced, and the processing time for the holding lens barrel 2 is reduced, thereby being capable of reducing the component cost, for example.

Second Embodiment

Figure 3:
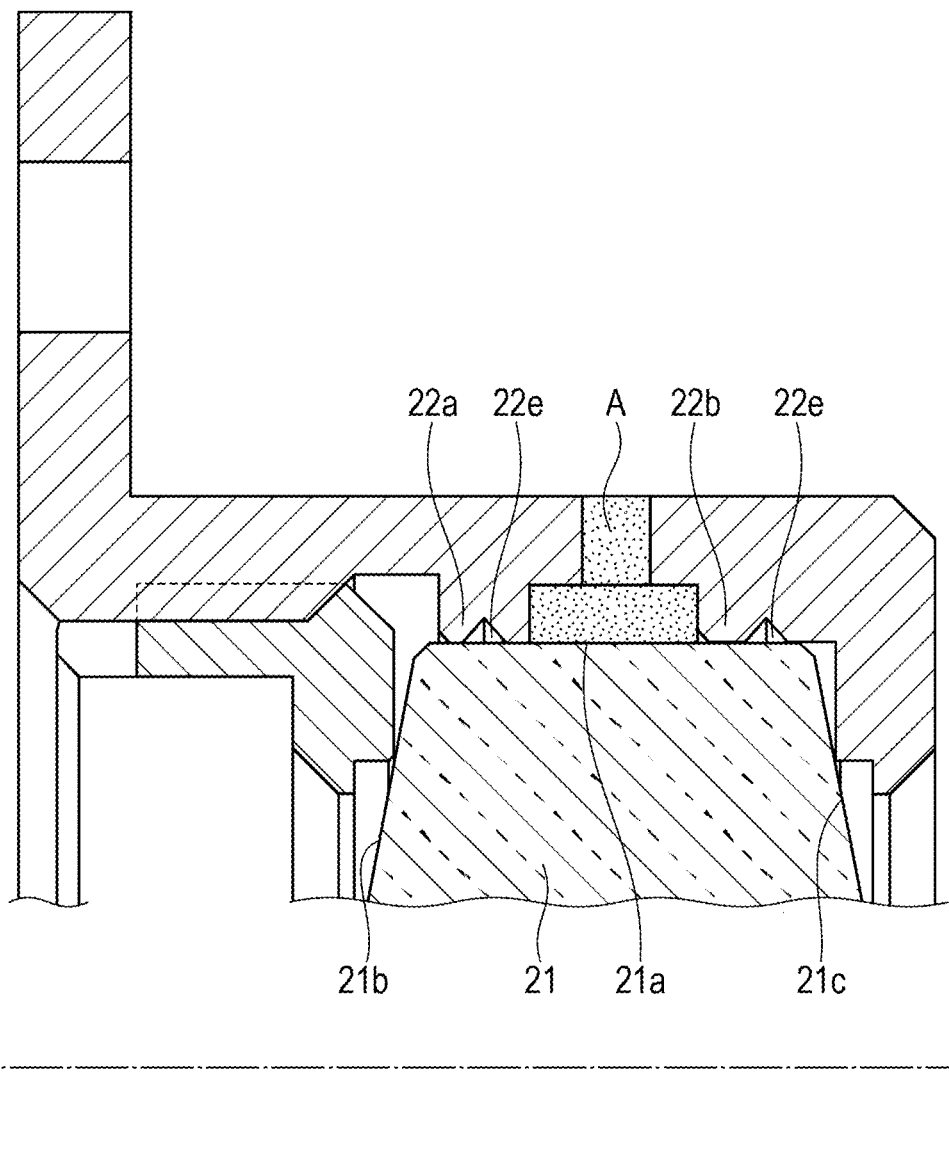
FIG. 3 is a sectional view of a holding lens barrel (22) of a second embodiment.

FIG. 3 is a partial sectional view of a holding lens barrel 22 according to a second embodiment. In the following, configurations different from those of the first embodiment are described, and description of the same configurations as those of the first embodiment is omitted. Fitting portions 22a and 22b formed on an inner surface of the holding lens barrel 22 are fitted to an outer peripheral surface 21a (side surface) of an optical system 21, and the fitting portions 22a and 22b each have a V groove 22e (groove) having a substantially V shape. With such a configuration, even when the adhesive A intrudes between the fitting portions 22a and 22b and the outer peripheral surface 21a of the optical system 21, the adhesive A accumulates in the V grooves 22e, thereby being capable of preventing the adhesive A from permeating surfaces 21b and 21c of the optical system 21. That is, the V grooves 22e each function as an accumulating portion (accumulator; accumulating pool) for the leaked adhesive A.

Third Embodiment

Figure 4:
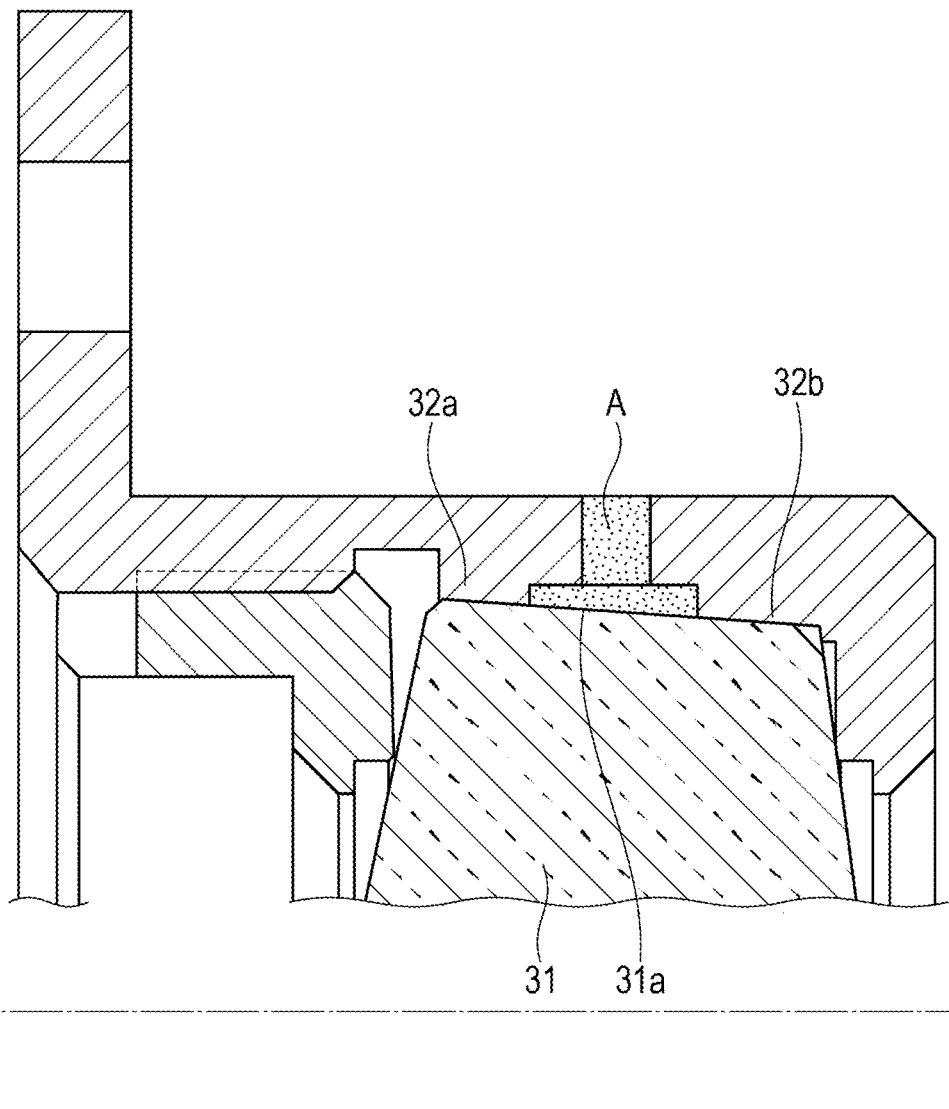
FIG. 4 is a sectional view of a holding lens barrel (32) of a third embodiment.

FIG. 4 is a partial sectional view of a holding lens barrel 32 according to a third embodiment. In the following, configurations different from those of the first embodiment are described, and description of the same configurations as those of the first embodiment is omitted. Fitting portions 32a and 32b of the holding lens barrel 32 each have a shape inclined with respect to the direction of the optical axis O (tapered portion). An outer peripheral surface 31a (side surface) of an optical system 31 also has a shape inclined corresponding to the fitting portions 32a and 32b, and the fitting portions 32a and 32b are fitted to the outer peripheral surface 31a of the optical system 31. In assembly, when the optical system 31 is inserted into the holding lens barrel 32, the outer peripheral surface 31a and the fitting portions 32a and 32b come in contact with each other, thereby being capable obtaining the same effect as that of the first embodiment. Further, with such a configuration, the outer peripheral surface 31a is positioned along the fitting portions 32a and 32b, thereby also obtaining an effect of allowing the center axes of the optical system 31 and the holding lens barrel 32 to easily match each other.

In each embodiment of the present disclosure, the interchangeable lens configured to perform still image and moving image photography has been described, but the same effect may be obtained in a lens barrel that is interchangeable such as a projection lens or an optical element for a copying machine. Further, a lens barrel to which the present disclosure is applied is used for an image pickup apparatus including an image pickup element configured to pick up an image formed by a lens barrel or an image pickup system including an image pickup apparatus main body including an image pickup element and having a lens barrel removably mounted thereto. Further, the present disclosure can be applied also to a lens integrated image pickup apparatus.

The preferred embodiments of the present disclosure have been described above. The present disclosure is not limited to those embodiments, and various modifications and changes can be made thereto within the scope of the gist of the present disclosure. Further, when an optical apparatus including the lens barrel of the present disclosure and an image pickup apparatus including the optical apparatus are achieved, the optical apparatus and the image pickup apparatus that provide the effect of the present disclosure can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-070661, filed Apr. 9, 2020, which is hereby incorporated by reference herein in its entirety.

What is claimed is:

1. A lens barrel comprising:
an optical element;
a holding member configured to hold the optical element on an inner surface of the holding member; and
an adhesive with which a side surface of the optical element and the inner surface of the holding member are adhered to each other, wherein
a hole is formed in the holding member from an outer surface toward the inner surface of the holding member, the adhesive being injected in the hole;
a groove is formed in the inner surface of the holding member, the groove communicating with the hole; and
a fitting portion on the inner surface of the holding member disposed on an outer side of the groove is fitted to the side surface of the optical element.

2. The lens barrel according to claim 1, wherein the groove is larger than the hole in a direction of an optical axis.

3. The lens barrel according to claim 1, wherein the side surface of the optical element extends along a circumference of the optical element.

4. The lens barrel according to claim 3, wherein the fitting portion extends along the circumference of the optical element.

5. The lens barrel according to claim 4, wherein the groove extends along the circumference of the optical element.

6. The lens barrel according to claim 1, wherein a groove is formed in the fitting portion.

7. The lens barrel according to claim 1, wherein the fitting portion includes a tapered portion.

8. The lens barrel according to claim 1, wherein the hole is an elongated hole.

9. The lens barrel according to claim 1, wherein a plurality of ones of the hole are formed in the holding member.

10. The lens barrel according to claim 5, wherein the groove extends over an entirety of the circumference of the lens barrel.

11. The lens barrel according to claim 1, further comprising a pressing member configured to press the optical element against the holding member.

12. An optical apparatus comprising a lens barrel, the lens barrel including:
an optical element;
a holding member configured to hold the optical element on an inner surface of the holding member; and
an adhesive with which a side surface of the optical element and the inner surface of the holding member are adhered to each other, wherein
a hole is formed in the holding member from an outer surface toward the inner surface of the holding member, the adhesive being injected in the hole;
a groove is formed in the inner surface of the holding member, the groove communicating with the hole; and
a fitting portion on the inner surface of the holding member disposed on an outer side of the groove is fitted to the side surface of the optical element.

13. An image pickup apparatus comprising:
an optical apparatus; and
an image pickup element configured to pick up an image formed by the optical apparatus,
wherein the optical apparatus including a lens barrel, the lens barrel including:
an optical element;
a holding member configured to hold the optical element on an inner surface of the holding member; and
an adhesive with which a side surface of the optical element and the inner surface of the holding member are adhered to each other, wherein
a hole is formed in the holding member from an outer surface toward the inner surface of the holding member, the adhesive being injected in the hole;
a groove is formed in the inner surface of the holding member, the groove communicating with the hole; and
a fitting portion on the inner surface of the holding member disposed on an outer side of the groove is fitted to the side surface of the optical element.

* * * * *